(12) United States Patent
Singh (10) Patent No.: US 8,347,094 B2
(45) Date of Patent: *Jan. 1, 2013

(54) SECURING WIRELESS BODY SENSOR NETWORKS USING PHYSIOLOGICAL DATA

(75) Inventor: Kalvinder Pal Singh, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 1036 days.

This patent is subject to a terminal disclaimer.

(21) Appl. No.: 12/109,890

(22) Filed: Apr. 25, 2008

(65) Prior Publication Data

US 2009/0268911 A1    Oct. 29, 2009

(51) Int. Cl.
*G06F 21/00* (2006.01)
(52) U.S. Cl. ........................................... 713/169
(58) Field of Classification Search .................. 713/168, 713/169; 726/2
See application file for complete search history.

(56) References Cited

U.S. PATENT DOCUMENTS

| | | | |
|---|---|---|---|
| 7,206,649 B2 * | 4/2007 | Kirovski et al. | 700/94 |
| 2004/0049676 A1 * | 3/2004 | Dutertre et al. | 713/163 |
| 2004/0230809 A1 * | 11/2004 | Lowensohn et al. | 713/186 |
| 2007/0036355 A1 | 2/2007 | Terauchi et al. | |
| 2008/0209545 A1 * | 8/2008 | Asano | 726/19 |

OTHER PUBLICATIONS

Malasri et al., "Addressing Security in Medical Sensor Networks", HealthNet'07, Jun. 2007, San Juan, Puerto Rico, ACM, 2007, pp. 1-6.
Venkatasubramanian, "Secure Cluster Formation in BSN Using Physiological Values", 2007, pp. 1-19 http://impact.asu.edu/~mcn/cse591sp07/Final_presentations/Krishna_Final_Presentation.ppt.
Shudi et al., "Authenticated Symmetric-Key Establishment for Medical Body Sensor Networks", Journal of Electronics (China), vol. 24, No. 3, May 2007, pp. 421-427.
Asokan, "Initializing Security Associations for Personal Devices", Nokia Research Center, ZISC Workshop on Wireless Security, Sep. 2007, Helsinki Finland pp. 1-89 http://asokan.org/asokan/research/zisc-tut.pdf.

* cited by examiner

*Primary Examiner* — Jeffrey Pwu
*Assistant Examiner* — Anthony Brown
(74) *Attorney, Agent, or Firm* — Yee & Associates, P.C.; John D. Flynn (57) ABSTRACT

A password protocol for establishing secure communications between sensor nodes in a network using secure environmental values (SEV). A first sensor sends a message to a second sensor comprising the first sensor's location and a key encrypted by a first SEV. The second sensor responds with a message comprising a key encrypted by a second SEV and a first nonce encrypted by a session key. The first sensor sends a third message comprising the first nonce and a second nonce encrypted by the session key. The second sensor verifies the first nonce and sends a fourth message comprising the encrypted second nonce. The first sensor then verifies the second nonce.

27 Claims, 7 Drawing Sheets

A and B both know $SEV_1$ and $SEV_2$
A creates $t_A = g^{r_A}$, where $r_A$ is a random value
B creates $t_B = g^{r_B}$, where $r_B$ is a random value
$Z_{AB} = g^{r_A r_B}$ 602 — M1 A → B: $t_A$
604 — M2 B → A: $t_B$
606 — M3 A → B: $h_{SEV_1}(Z_{AB})$
608 — M4 B → A: $h_{SEV_2}(Z_{AB})$

A and B both know $SEV_1$ and $SEV_2$
A creates $t_A = r_A g$, where $r_A$ is a random value
B creates $t_B = r_B g$, where $r_B$ is a random value
$Z_{AB} = r_A r_B g$ 702 — M1 A → B: $t_A$
704 — M2 B → A: $t_B h_{SEV_1}(Z_{AB})$
706 — M3 A → B: $h_{SEV_2}(Z_{AB})$

SECURING WIRELESS BODY SENSOR NETWORKS USING PHYSIOLOGICAL DATA

BACKGROUND OF THE INVENTION

1. Field of the Invention

The present invention relates generally to computer and communications networks, and more specifically to securing wireless body sensor networks using physiological data.

2. Description of the Related Art

Sensor networks comprise a category of computer networks, characterized by the development of small, low cost sensor devices with combined sensing and communication (often wireless) capabilities. Most applications of sensor networks rely on combining information from multiple sensor devices to establish or infer some composite state or event of the sensed environment (often called the "sensing field"). The sensor devices are typically spread across a geographic area and contain some level of intelligence for signal processing and networking of the data. A sensor device may detect and monitor the value of some parameter at a given location, such as, for example, temperature, atmospheric pressure, relative humidity, etc.

One type of sensor network is a body sensor network. Body sensor networks typically comprise sensor devices, or sensor nodes, that are worn on or implanted within the body for measuring physiological data (vital signs, motion), combined with wireless components that wirelessly transmit the measured data to an external receiver, thus allowing continuous monitoring of patients in an unobtrusive manner in any environment. Each sensor node in a network may measure one or more types of a user's physiological data.

Devices within a body sensor network must be able to communicate with one another in a secure manner to ensure a user's privacy. To facilitate secure communication, data transfers between devices in the network are encrypted using either software or hardware techniques, such as key establishment protocols. However, wearable sensor nodes introduce a new set of technical problems due to resource limitations of the sensors. In a wireless body sensor network, sensors typically comprise small memories, weak processors, limited energy, and small packet size. In addition, sensors placed on or implanted within the body have no user interface, and may exist for long periods of time. The limitations of the sensors require that sensor networks be designed with extreme power conservation. As sensor nodes have little computational power, cryptographic ciphers must be used with care.

BRIEF SUMMARY OF THE INVENTION

Embodiments of the present invention relate to securing wireless body sensor networks using physiological data. In one embodiment, a first sensor sends a first message to a second sensor comprising a location of the first sensor and a first key encrypted using a first environmental value measured at the first sensor. The second sensor sends a second message to the first sensor comprising a second key encrypted using a second environmental value measured at the second sensor and a first nonce generated by the second sensor and encrypted using a session key shared between the first sensor and the second sensor. The first sensor sends a third message to the second sensor comprising the first nonce and a second nonce generated by the first sensor, wherein the first nonce and second nonce are encrypted using the session key. The second sensor verifies the first nonce and sends to the first sensor a fourth message comprising the second nonce encrypted using the session key. The first sensor then verifies the second nonce.

In a second embodiment, the first sensor sends a first message to the second sensor comprising a location of the first sensor and a first key encrypted using a first environmental value measured at the first sensor. The second sensor sends a second message to the first sensor comprising a second key encrypted using a second environmental value measured at the second sensor and a third environmental value measured at the second sensor and encrypted using a session key shared between the first sensor and the second sensor. The first sensor verifies the third environmental value and sends to the second sensor a third message comprising a fourth environmental value measured at the first sensor and encrypted using the session key. The second sensor then verifies the fourth environmental value.

In a third embodiment, the first sensor sends a first message to the second sensor comprising a first key. The second sensor sends to the first sensor a second message comprising a second key and a collision hash function encrypted using a first environmental value shared between the first sensor and the second sensor. The first sensor then sends to the second sensor the collision hash function encrypted using a second environmental value shared between the first sensor and the second sensor.

DETAILED DESCRIPTION OF THE INVENTION

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments of the present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Secure communication in a sensor network may be implemented using key establishment protocols. A protocol is a multi-party algorithm, defined by a sequence of steps specifying the actions required of two or more parties in order to achieve a specified objective. A key establishment protocol is a protocol whereby a shared secret becomes available to two or more parties, for subsequent cryptographic applications. Cryptography is the scrambling of information such that the information can only be unscrambled by an entity that holds the appropriate unscrambling key. By exchanging messages which can only be decrypted by those with access to the proper key, cryptographic protocols can be used as a means to authenticate entities. Asymmetric cryptography is often unsuitable for most sensor networks due to higher computational overhead, and energy and memory consumption. When using symmetric key cryptography to establish communication between two sensor devices in a sensor network, the key establishment protocols in wireless sensor networks may be sorted into main categories: pair-wise schemes, random key pre-distribution schemes, and Key Distribution Center (KDC). Key establishment protocols are used to set up shared secrets between sensor nodes. A pair-wise scheme is a protocol in which each node in a network shares a unique pairwise key with every other node in the network. A random key pre-distribution scheme relies on a random graph which is connected with high probability if the average degree of the network nodes is above a threshold. A Key Distribution Center (KDC) is a protocol where when two entities sharing no previous secret want to communicate securely with each other, they do so with the assistance of a third party, which has an existing shared key between both entities.

A new fourth category for providing secure communication between sensors comprises key establishment protocols which use environmental values to establish symmetric keys. An environmental value comprises a data value measured by sensors placed in a particular environment. In one embodiment, an environmental value may comprise physiological data. For example, the environmental values may include physiological data measured from a human body environment. These environmental values may also include measurements taken from other animate objects (e.g., animals, etc.), as well as inanimate objects or other environments. Physiological values of individuals which have been measured using sensors in a body sensor network may include interpulse interval (IPI) and heart rate variance (HRV). A physiological value measured for an individual can provide a cryptographically random number used to encrypt a new symmetric key between a sensor pair.

For example, to initiate a key establishment protocol between a pair of sensor nodes, the first sensor in the pair generates a new session key and a nonce. The new key is used as the shared secret between the sensor pair. A nonce may be a randomly generated value or a counter value used by the receiving sensor node to confirm that the data is fresh and is not a "replay" of earlier data. A replay attack is a form of network attack in which a valid data transmission is maliciously or fraudulently repeated or delayed. The replay adversary may intercept and retransmit data, masquerading as one of the nodes to trick the receiver into unauthorized operations such as false identification or authentication or a duplicate transaction. To prevent replay attacks, nonces are sent in messages from the first sensor to initiate a key establishment protocol. An exemplary key establishment protocol for sending, from node A to neighboring sensor node B, a single message comprising a new key is shown below:

$$A \rightarrow B: N_A, [N_A]_{RANDKEY}, \text{RANDKEY} \oplus \text{SEV},$$

where A and B are the two nodes who wish to share a new session key (RANDKEY), $N_A$ is a nonce generated by node A, and RANDKEY$\oplus$SEV is an exclusive-or operation comprising a concatenation of data strings RANDKEY and SEV. SEV is a secure environmental value which comprises physiological data measured by a sensor in the network.

The first sensor (node A) encrypts its generated nonce using the new key, RANDKEY. As nonce $N_A$ was randomly generated by the first sensor node, playback attacks may be defeated because the replayer cannot know in advance the nonce the first sensor will generate. The new key is then encrypted with the sensor-measured physiological value, or secure environmental value (SEV), which is measured by and known only to each of the sensors placed on a particular person. Upon receiving the message, the receiving sensor (node B) may decrypt the new key using the secure environmental value and validate that the new key is correct by verifying the message authentication code (MAC) of the nonce.

A problem with existing key establishment protocols that employ physiological values in this manner is that the existing protocols require all of the sensor nodes in a network be able to measure the same phenomenon in order to provide secure communication. Using the heart rate variance (HRV) as an example, all of the sensor nodes on the body would have to measure this heart rate variance phenomenon. Thus, a receiving sensor node would be able to measure the heart rate variance that the first sensor used to encrypt the new key. To ensure secure communications between nodes in the network, only cryptographically strong physiological values should be measured and used as SEVs. A cryptographically strong physiological value is a value from sensed data in the environment that can be obtained by the sensors and is difficult to obtain through any other means. However, developing technology (e.g., ultra wideband (UWB) and radar) may be used to remotely capture the heart rate and may cause security risks when using only SEVs such as inter-pulse interval and heart rate variance to secure the communication. Physiological values such as blood pressure or iron count are less susceptible to those remote attacks; however, these values are cryptographically weaker physiological values, thus providing limited security. Furthermore, the use of PIN code or a password is not applicable to body sensor networks, since many of the sensors do not have a user-interface. Sensors may be placed in hard to reach areas, with some of the sensors implanted within the body. Also, the sensors may harvest energy directly from the body, allowing the sensors to exist for long periods of time.

Although it is not practical to use PINs and passwords in body sensors because it can be difficult to change the passwords on the sensors, password protocols may be implemented in the sensor network environment. A password protocol is a protocol that provides mutual authentication based on a password. Password protocols are typically implemented in a sensor network using either a human-entered password on the sensor or an existing 64 bit key. Password protocols are designed so that both offline and online attacks are not feasible. A feature or by-product of most password protocols is that if the password is compromised, any keys created before the password was compromised will not be compromised.

Password protocols have the special property of allowing secrets with small entropy (low randomness) to be used for key establishment. Since passwords have low randomness, they provide cryptographically weak secrets. For instance, a four digit PIN used in a password protocol contains less than 14 bits of randomness. A typical password length of eight characters has less than 48 bit of randomness, when randomly choosing upper and lower case letters as well as the digits 0 to 9. Key sizes in sensor networks are small, normally 64 bits, to enable encryption or integrity tests to consume a minimum amount of energy. As small key sizes result low randomness, the small sizes lead to the need to update keys on a regular basis for security purposes.

The illustrative embodiments provide a password protocol for authenticating and generating new session keys. In particular, the password protocol establishes secure communications between sensor nodes in a network using secure environmental values (SEV) in place of using cryptographically weak small keys or passwords. Physiological data measured by sensors in a body sensor network is used as SEVs in the password protocol. Thus, physiological data may replace passwords in the password protocol. As many SEVs have low randomness (and thus are cryptographically weak secrets), SEVs have similar characteristics to passwords and small keys. The illustrative embodiments also provide a password protocol utilizing physiological data as passwords which minimizes the number of messages required to be sent in the password protocol.

When establishing a new session key between sensor nodes in a sensor network, the same environmental phenomenon may be measured by the nodes. However, unlike in other password protocols where the password is constant throughout the running of the protocol, the environmental data measured by the sensor nodes may change. For some protocols, such as the encrypted key exchange (EKE) protocol or the Anderson-Lomas protocol, using changing environmental data within the protocol increases the security of the protocol. A password protocol is provided in the illustrative embodiments which utilizes these changing environmental values to stop active password attacks. Environmental values such as inter-pulse intervals, heart rate variance, and other physiological data are employed by the illustrative embodiments in password protocols to authenticate and generate new session keys. In one embodiment, the physiological values are implemented using a modified Anderson-Lomas password protocol. The protocol is modified to utilize elliptical curves. Elliptic curve cryptography (ECC) is an approach to public-key cryptography based on the algebraic structure of elliptic curves over finite fields. Elliptic curve systems are more computationally efficient than the RSA and Diffie-Hellman public key systems, and also offer more security per bit increase in key size than either RSA or Diffie-Hellman.

Figure 1:
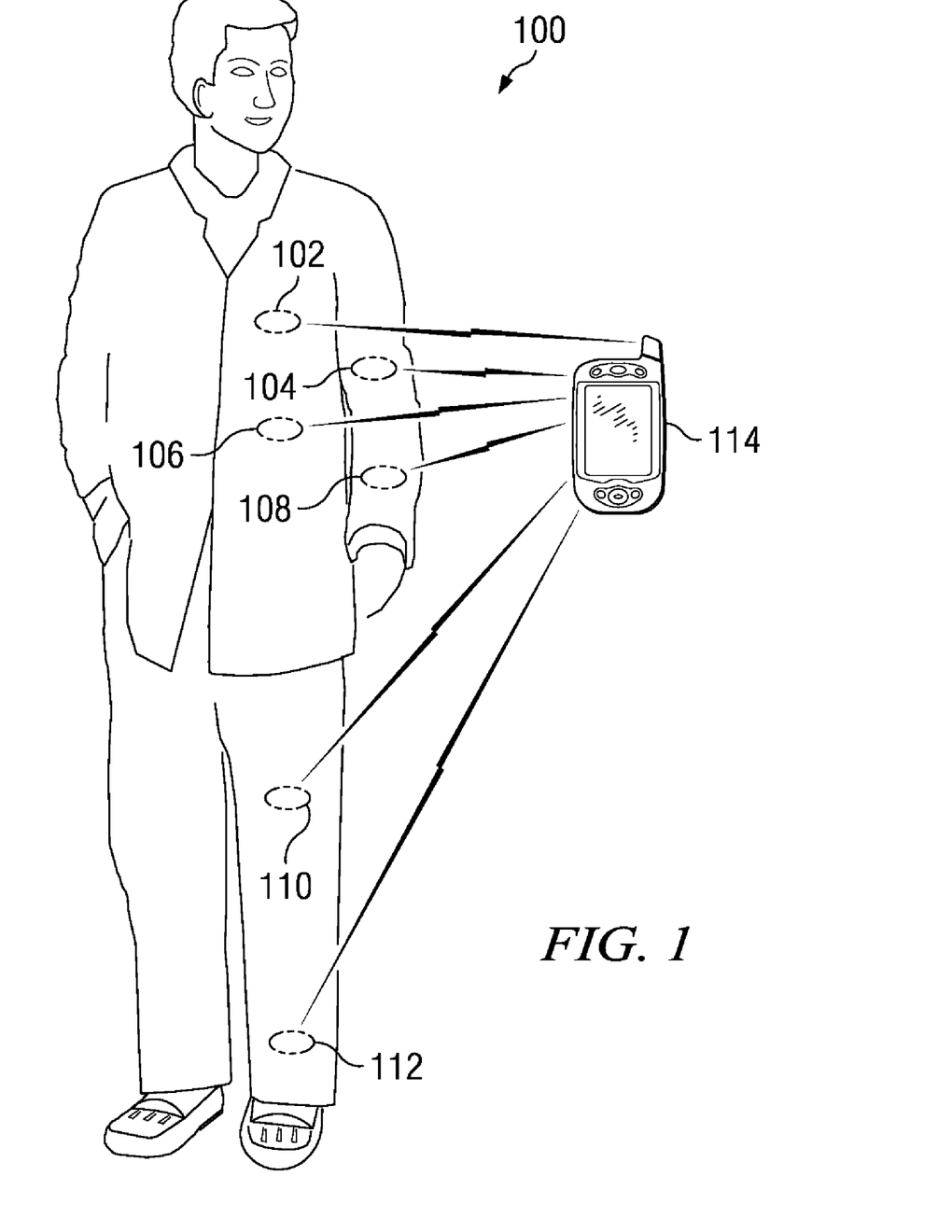
FIG. 1 is a pictorial representation of an exemplary wireless body sensor network in which the illustrative embodiments may be implemented.

Turning now to FIG. 1, a pictorial representation of an exemplary wireless body sensor network in which the illustrative embodiments may be implemented is shown. In this illustrative example, wireless body sensor network 100 includes a plurality of body-worn sensor nodes 102-112 and personal server 114. Depending upon the particular implementation, sensor nodes 102-112 may comprise patches or devices worn on the user's skin or incorporated in the user's shoes or clothing. Sensor nodes 102-112 may also comprise implanted devices within the user's body.

Sensor nodes 102-112 monitor environmental data about the user. In particular, each sensor node is capable of collecting, processing, and communicating physiological data about the user to personal server 114, and may be in use for extended periods of time. This physiological data may include, but is not limited to, inter-pulse interval (IPI) and heart rate variance (HRV). Each sensor node may be configured to measure one or more types of physiological data. Two or more of sensor nodes 102-112 may also be configured to measure the same type of physiological data. Each sensor node may transmit messages wirelessly to other sensor nodes through body sensor network 100.

Personal server 114 comprises a data processing system external to the user's body which controls wireless body sensor network 100. Personal server 114 may be implemented on a personal computer, laptop, personal digital assistant (PDA), cell phone, etc. Personal server 114 receives collected physiological data from sensor nodes 102-112 on the user through wireless body sensor network 100. Upon collecting the physiological data, personal server 114 may process the data and send this user information wirelessly through the Internet or a mobile telephone network to a medical information or hospital system (not shown).

Figure 2:
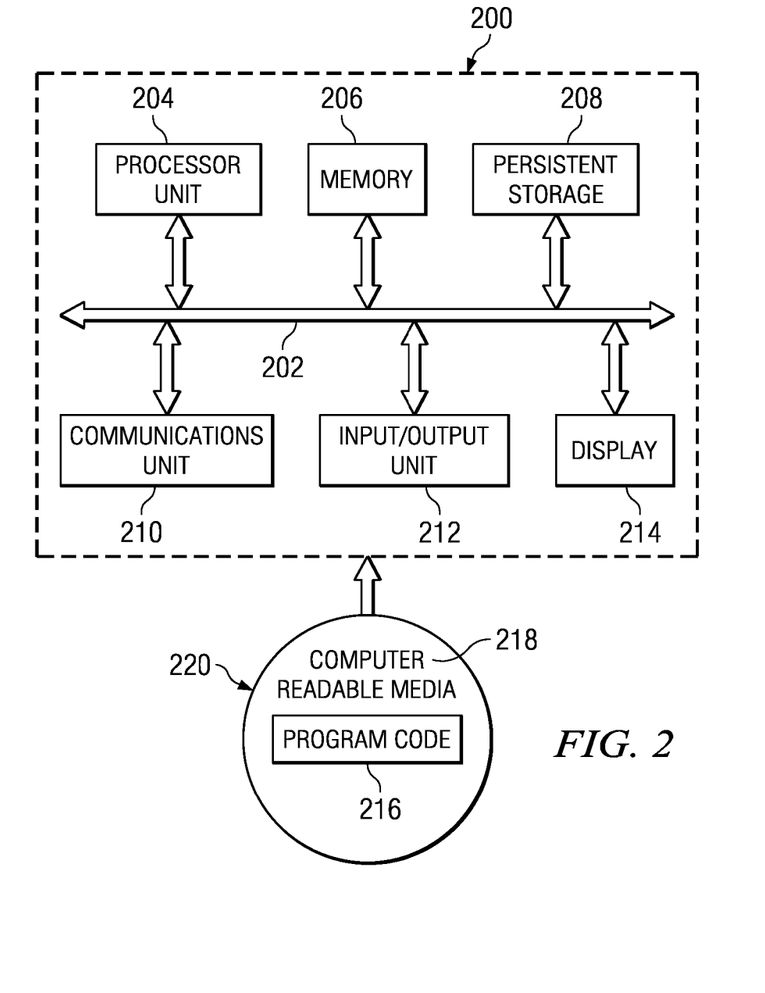
FIG. 2 is a block diagram of a data processing system with which the illustrative embodiments may be implemented.

FIG. 2 is a diagram of a data processing system in accordance with an illustrative embodiment of the present invention. Data processing system 200 is an example of personal server 114 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
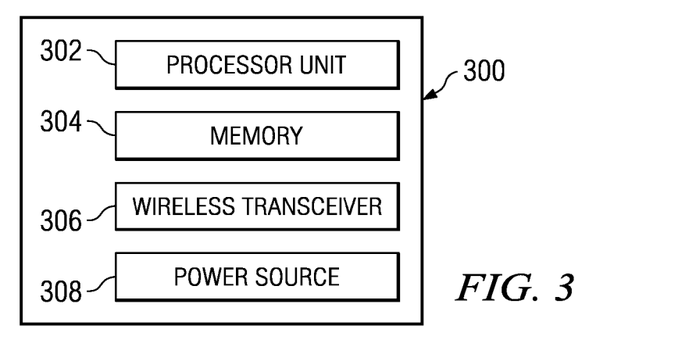
FIG. 3 is a block diagram of an exemplary sensor device with which the illustrative embodiments may be implemented.

FIG. 3 is a block diagram of an exemplary sensor device with which the illustrative embodiments may be implemented. Sensor device 300 is an example of sensor devices 102-114 in FIG. 1. In this illustrative example, sensor device 300 includes processor unit 302, memory 304, wireless transceiver 306, and power source 308. The components illustrated for sensor device 300 are not meant to provide architectural limitations to the manner in which different embodiments may be implemented. Other components shown in FIG. 3 can be varied from the illustrative examples shown.

Processor unit 302 executes instructions for software that may be loaded into memory 304. Memory 304, in these examples, may be, for example, a random access memory or any other suitable volatile or non-volatile storage device. Processor unit 302 may also receive wireless transmissions from other sensor devices in the body sensor network or from an external device such as personal server 114 in FIG. 1. These wireless transmissions may include instructions for monitoring and collecting physiological data, the physiological data collected by the sensor, and messages to initiate key establishment protocols for secure communication between the devices.

Wireless transceiver 306 provides for communications with other data processing systems or sensor nodes. Wireless transceiver 306 may provide communications through the use of wireless technology such as, for example, a Bluetooth™ connection. Power source 308 provides an energy source for operation of sensor device 300. In these examples, power source 308 may comprise a battery.

Figure 4:
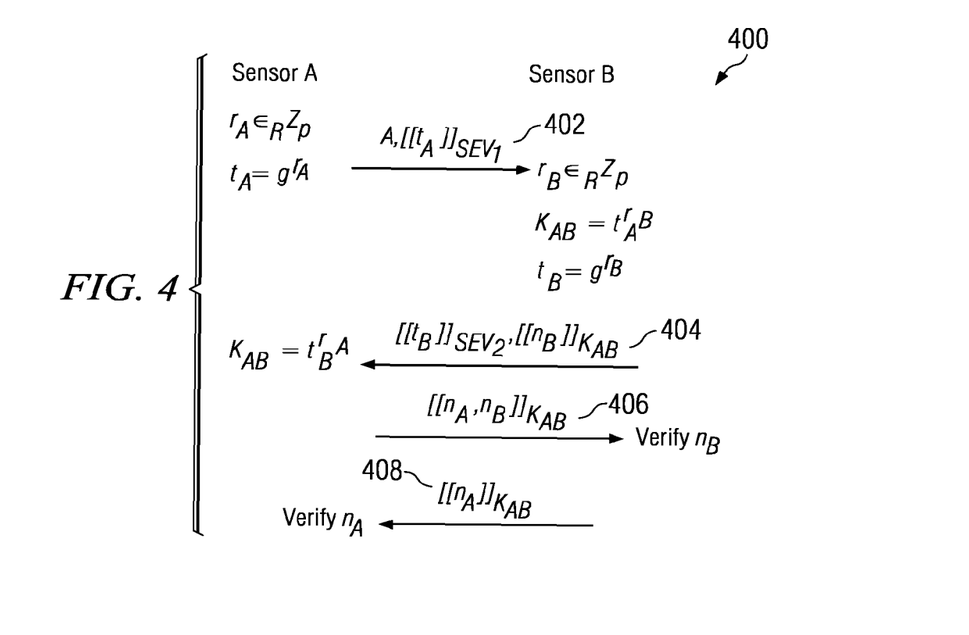
FIG. 4 illustrates an exemplary Diffie-Hellman-based encrypted key exchange (EKE) protocol which uses environmental data as passwords in accordance with the illustrative embodiments.

FIG. 4 illustrates an exemplary Diffie-Hellman-based encrypted key exchange (EKE) protocol which uses environmental data as passwords in accordance with the illustrative embodiments. Specifically, a password protocol is provided which uses physiological data measured in a body sensor network to provide secure communications in the network. The EKE protocol is an RSA-based (Rivest, Shamir, and Adleman) password protocol for mutual authentication in which messages are encrypted using a shared password as a shared symmetric key, and where the exponent only needs to be 160 bits. Other variants of password protocols require exponents of size 1024 bits. The Diffie-Hellman key establishment protocol is a fundamental algebraic protocol presented in W. Diffie and M. E. Hellman, "New Directions in Cryptography," IEEE Transaction on Information Theory vol. IT 22 (November 1976), pp. 644-654. The Diffie-Hellman protocol provides a solution to the key distribution problem, allowing two parties, never having met in advance or sharing keying material, to establish a shared secret by exchanging messages over an open channel.

Protocol 400 allows the conversion of a cryptographically weak secret (e.g., an SEV) used to encrypt elements of a Diffie-Hellman exchange into a cryptographically strong secret that may be used for the remainder of the session without divulging information that would enable an adversary to verify guesses of the weak secret. In protocol 400, information shared between sensor node A and sensor node B comprises random number generator g of G where p−1=qr, wherein r is a random number and p and q are random prime numbers. The value of p should be as close to $2^N-1$ as possible for higher security.

Protocol 400 contains four messages. Sensor node A calculates the first part of the Diffie-Hellman key exchange $t_A=g^{r_A}$, where $r_A$ is a random value. The exponent is a random value defined as $r_A \epsilon_R Z_P$, where the size of p is 160 bits. Sensor node A sends message M1 402 to sensor node B. Message M1 402 comprises the location A of sensor node A and key $t_A$. Instead of encrypting key $t_A$ with a typical password, key $t_A$ is encrypted using an environmental value measured by sensor node A, or weak key $SEV_1$.

When sensor node B receives message M1 402 from sensor node A, sensor node B calculates the second part of the Diffie-Hellman key exchange $t_B=g^{r_B}$, where $r_B$ is a random value, and thus sensor B is able to calculate the shared session key $K_{AB}=t_A^{r_B}$. The exponent is a random value defined as $r_B \epsilon_R Z_P$. Sensor node B then sends a message M2 404 to sensor node A. Message M2 404 comprises key $t_B$ encrypted using an environmental value measured by sensor node B, or weak key $SEV_2$. Message M2 404 also comprises a nonce value ($n_B$) generated by sensor node B and encrypted using the shared session key $K_{AB}$.

Messages M3 406 and M4 408 comprise authentication code to authenticate sensor nodes A and B, as well as confirm that both sensors have session key $K_{AB}$. When sensor node A receives message 404 from sensor node B, sensor node A is able to calculate the shared session key $K_{AB}=t_B^{r_A}$ and sends message M3 406 to sensor node B. Message M3 406 comprises nonce value ($n_A$) generated by sensor node A and nonce value ($n_B$), both of which are encrypted using the shared session key $K_{AB}$. Sensor node B verifies the nonce value $n_B$ sent in message M3 406. If the nonce value is valid, sensor node B sends message M4 408 to sensor node A, which comprises nonce value ($n_A$) encrypted by session key $K_{AB}$. Sensor node A then verifies the nonce value $n_A$ sent in message M4 408. If the nonce value is valid, a secure communication has been established between sensors A and B. The encryption of $t_A$, $t_B$, $n_A$, and $n_B$ may be implemented with an exclusive-or function.

Sensor nodes A and B may measure the same environmental phenomenon (e.g., heart rate variance) to obtain $SEV_1$ and $SEV_2$. Sensor nodes A and B may be synchronized to measure the same environmental phenomenon at the same time. If the environmental data measured by each of sensors A located on one part of the body and B located on another part of the body stays constant throughout the running of protocol 400, then the values of both $SEV_1$ and $SEV_2$ will be the same. Since protocol 400 is designed for a constant password throughout the running of the protocol, similar or same data for both $SEV_1$ and $SEV_2$ will not adversely affect the protocol. However, depending on which environmental data is measured by the sensors and how long protocol 400 will run, physiological data may change such that a measurement taken by sensor A and used for $SEV_1$ may differ from a measurement taken by sensor B and used for $SEV_2$. Consequently, $SEV_1$ used in the request will differ from $SEV_2$ in the response. In this case, when sensor node A sends a message encrypted using $SEV_1$, sensor node B may obtain the proper $SEV_1$ value to decrypt the message. Since the sensor nodes are synchronized, sensor node B may use the length of time it takes to send the message from sensor node A to sensor node B to determine how far back sensor node B needs to go in its measured SEV values to locate the proper $SEV_1$ value to decrypt sensor node A's message. Sensor node A may also determine the proper $SEV_2$ value and decrypt sensor node B's message in the same manner.

Protocol 400 was originally designed to handle small entropy secrets, so that off-line and on-line dictionary attacks are infeasible for an adversary. Even if the secrets $SEV_1$ or SEV$_2$ are compromised or available freely after the running of the key establishment protocol, the session key K$_{AB}$ will remain secure and safe. Both nonces n$_A$ and n$_B$ are cryptographically strong random numbers, allowing the exclusive-or function to be used for encryption. If any nonce was not cryptographically strong, a n$_A \oplus$K$_{AB}$ or n$_B \oplus$K$_{AB}$ operation would allow an adversary to significantly reduce the number of valid K$_{AB}$ values. A characteristic of protocol 400 is that the nonces are never sent out in the clear, since the nonces are used to encrypt the new key K$_{AB}$.

Figure 5:
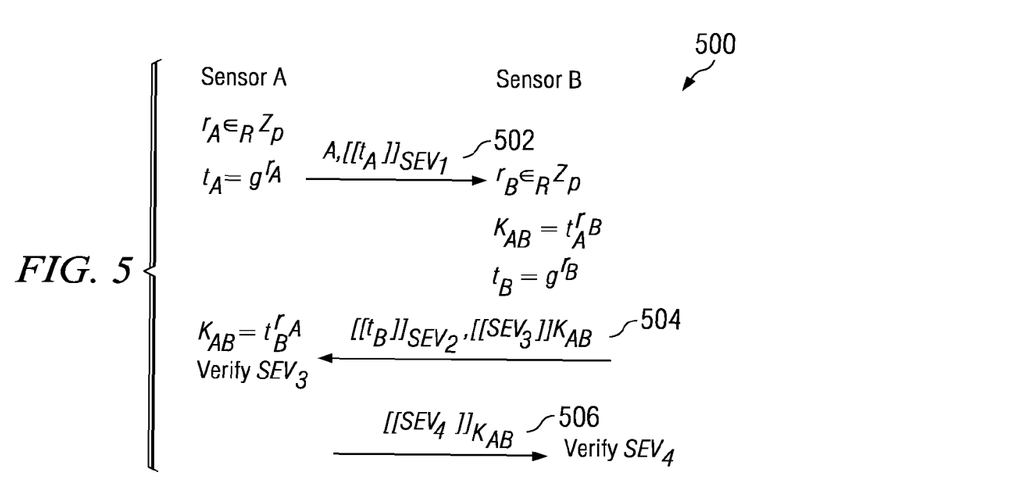
FIG. 5 illustrates an exemplary EKE protocol in which nonces comprising environmental data may be used to minimize the number of protocol messages in accordance with the illustrative embodiments.

FIG. 5 illustrates an exemplary EKE protocol in which nonces comprising environmental data may be used to minimize the number of protocol messages in accordance with the illustrative embodiments. Protocol 500 is used to establish a new session key between two sensor nodes, such as sensor nodes A and B. In contrast with typical EKE protocols which employ passwords, protocol 500 uses environmental phenomena for key establishment. The sensor nodes may measure the same environmental phenomenon and use the SEVs in the password protocol. However, depending on which environmental data is measured by the sensors and how long the protocol will run, a measurement taken by sensor A may differ from a measurement taken by sensor B due to changes in the physiological data. As communication is an expensive operation in sensor networks, protocol 500 takes advantage of changing SEVs to reduce the number of messages and the number of bits sent between nodes in the protocol. Protocol 500 expands the use of SEVs to not only be the small entropy key, but also to replace the nonces in the protocol. Expanding use of the SEVs provides an added advantage of removing a message from the protocol, thereby reducing the number of messages from four to three.

Communications costs may also be reduced using protocol 500. In the current art, when communicating parties use their counter values as nonces, the nonces are sometimes omitted from protocol messages since it is assumed that each party knows the other's counter value. However, if messages get lost, the shared counter state can become inconsistent. While protocols may be used to synchronize the counter between the nodes, the synchronization protocols add extra overhead to sensors. In addition, in a lossy environment, there may be a need for a large number of synchronization attempts. Protocol 500 reduces the communications costs by using SEVs instead of a counter or a nonce.

In protocol 500, information shared between sensor node A and sensor node B comprises generator g of G where p−1=qr. Protocol 500 contains three messages. Sensor node A calculates the first part of Diffie-Hellman t$_A$=g$^{r_A}$ and sends a message M1 502 to sensor node B. Message M1 502 comprises the location A of sensor node A and key t$_A$ encrypted using an environmental value measured by sensor node A, or weak key SEV$_1$.

When sensor node B receives message M1 502 from sensor node A, sensor node B calculates the second part of Diffie-Hellman t$_B$=g$^{r_B}$ and the shared session key K$_{AB}$=t$_A^{r_B}$ between sensor node A and B. Sensor node B then sends a message M2 504 to sensor node A comprising key t$_B$ encrypted using an environmental value measured by sensor node B, or weak key SEV$_2$. Instead of containing a nonce value, message M2 504 also comprises another environmental value measured by sensor node B, or SEV$_3$, which is encrypted using the shared session key K$_{AB}$.

Upon receiving message M2 504 from sensor node B, sensor node A calculates the shared session key K$_{AB}$=t$_B^{r_A}$ and verifies SEV$_3$. Sensor node A then sends message M3 506 comprising another environmental value measured by sensor node A, or SEV$_4$, and encrypted with shared session key K$_{AB}$ to sensor node B. Sensor node B may then verify SEV$_4$.

The encryption of t$_A$ and t$_B$ may be implemented with an exclusive-or function. If an SEV is not cryptographically strong, a stronger encryption mechanism than the exclusive-or is required. In addition, the values of each SEV should be different from the other SEVs. If the SEV value is the same throughout the running of the protocol, then the SEV should be modified, such as adding a number to the SEV. For example, the SEV used throughout the protocol may be a hash of the original SEV, so SEV$_1$=h(SEV, 1), SEV$_2$=h(SEV, 2), SEV$_3$=h(SEV, 3), and SEV$_4$=h(SEV, 4).

Figure 6:
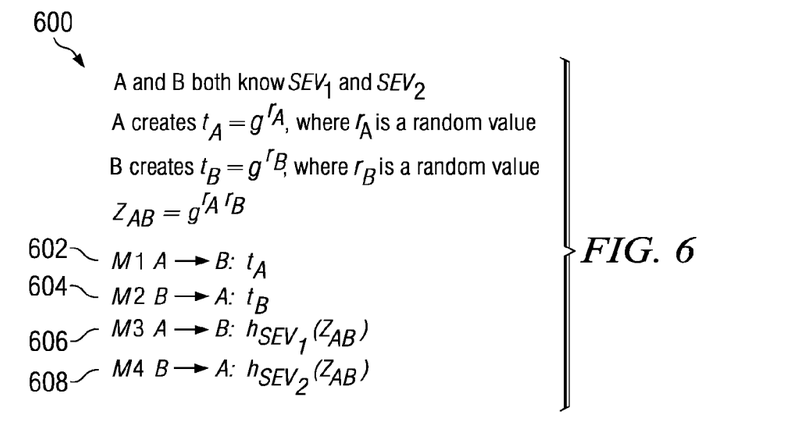
FIG. 6 illustrates an Anderson-Lomas protocol.

FIG. 6 illustrates an Anderson-Lomas protocol. The Anderson-Lomas protocol comprises the Diffie-Hellman exchange followed by an exchange of authenticating values using a hash of the SEVs. Unlike the EKE protocol, the Anderson-Lomas protocol uses elliptic curves in an efficient deterministic method.

In protocol 600, information shared between sensor node A and sensor node B comprises SEV$_1$ and SEV$_2$. Sensor node A creates the first part of the Diffie-Hellman key exchange t$_A$=g$^{r_A}$, where r$_A$ is a random value. Sensor node B creates the second part of the Diffie-Hellman key exchange t$_B$=g$^{r_B}$, where r$_B$ is a random value. Using the keys t$_A$ and t$_B$, shared secret Z$_{AB}$ may be created from the Diffie-Hellman ephemeral secret g$^{r_A r_B}$. An ephemeral key is a public key that is used only for the duration of the key establishment protocol and then destroyed together with the corresponding private key.

Messages M1 602 and M2 604 comprise the Diffie-Hellman part of the protocol. In message M1 602, sensor node A sends key t$_A$ to sensor node B. In response, sensor node B sends message M2 604 comprising key t$_B$ to sensor node A. Messages M3 606 and M4 608 are used to authenticate that sensor node A sent t$_A$ to sensor node B, and that sensor node B sent t$_B$ to sensor node A. In message M3 606, sensor node A sends the authenticator h$_{SEV_1}$(Z$_{AB}$) to sensor node B. Sensor node B sends the authenticator h$_{SEV_2}$(Z$_{AB}$) to sensor node A in message M4 608.

The function h is a collisionful hash function. The specific collisionful hash function used in the Anderson-Lomas protocol is:

$$h_k(x) = H(MAC_k(x) \bmod 2^m, x)$$

The function is supplied with two parameters, a key k and a bit-string x. When function h is supplied with k and x, it is easy to compute h$_k$(x). If function h is supplied with k and h$_k$(x), it may be hard to find a value y such that h$_k$(x)=h$_k$(y), where x does not equal y. Given x and h$_k$(x), it is difficult to compute k, although it is less hard to find k' such that h$_k$(x)=h$_{k'}$(x), where k does not equal k'.

The value m is a pre-defined value known by all parties and H is a one-way hash function. It is easy to find many k values that give the same output when m is small. Anderson and Lomas suggest to take m=n/2 where 2$^n$ is the size of the password space, allowing the protocol to use SEV$_1$ and SEV$_2$ as the key h. Consequently, a guess for either SEV$_1$ or SEV$_2$ may only be verified with probability 2$^{-n/2}$.

An adversary may try to mount an active attack by posing as sensor node B and attempting to guess the message M3 606; this will succeed with probability 2$^{-n/2}$. Therefore, an active adversary can reduce the number of possible passwords to the square root of the initial number of passwords. Thus, in traditional networks the protocol leaks a larger amount of information than the other protocols.

Figure 7:
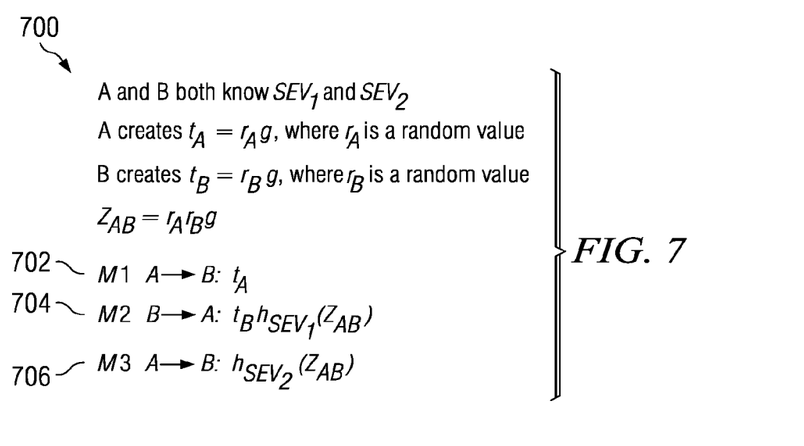
FIG. 7 illustrates an exemplary Anderson-Lomas protocol utilizing elliptical curves in accordance with the illustrative embodiments.

A defense against this type of attack is to change the password if an invalid password check has been detected. However changing the password can be difficult in traditional networks and can produce an effective denial-of-service attack. In an environment where the SEVs are continually changing, however, the Anderson-Lomas protocol may be useful. FIG. 7 illustrates an exemplary Anderson-Lomas protocol utilizing elliptical curves in accordance with the illustrative embodiments. The modified protocol in FIG. 7 comprises physiological values which may be used to stop active password attacks in an environment where SEVs are continually changing. Protocol 700 has been modified to remove one of the messages and to utilize elliptic curves. Since protocol 700 does not encrypt the ephemeral values, encryption algorithms are no longer required.

In protocol 700, message M1 702 is the same as message M1 602 in FIG. 6 (sensor node A sends key $t_A$ to sensor node B), except an elliptic curve point is sent (for achieving a more computationally efficient process). In message M2 704, sensor node B sends key $t_B$ to sensor node A, and an elliptic curve point is also sent. However, in contrast with protocol 600 in FIG. 6, message M2 704 also comprises the authenticator $h_{SEV_1}(Z_{AB})$, rather than sending the authenticator in a separate message. Message M3 706 is the same as message M4 608 in FIG. 6, where sensor node A sends the authenticator $h_{SEV_2}(Z_{AB})$ to sensor node A.

Protocol 700 provides a defense against active attacks in an environment with changing SEV values. It should be noted that if the SEVs do not change between several instantiations of protocol 700, then the protocol may suffer from an active attack. However, unlike the traditional Anderson-Lomas protocol 600, an adversary can pose as sensor node A. Consequently, the adversary does not need to wait for a sensor to send a request for a new key.

Figure 8:
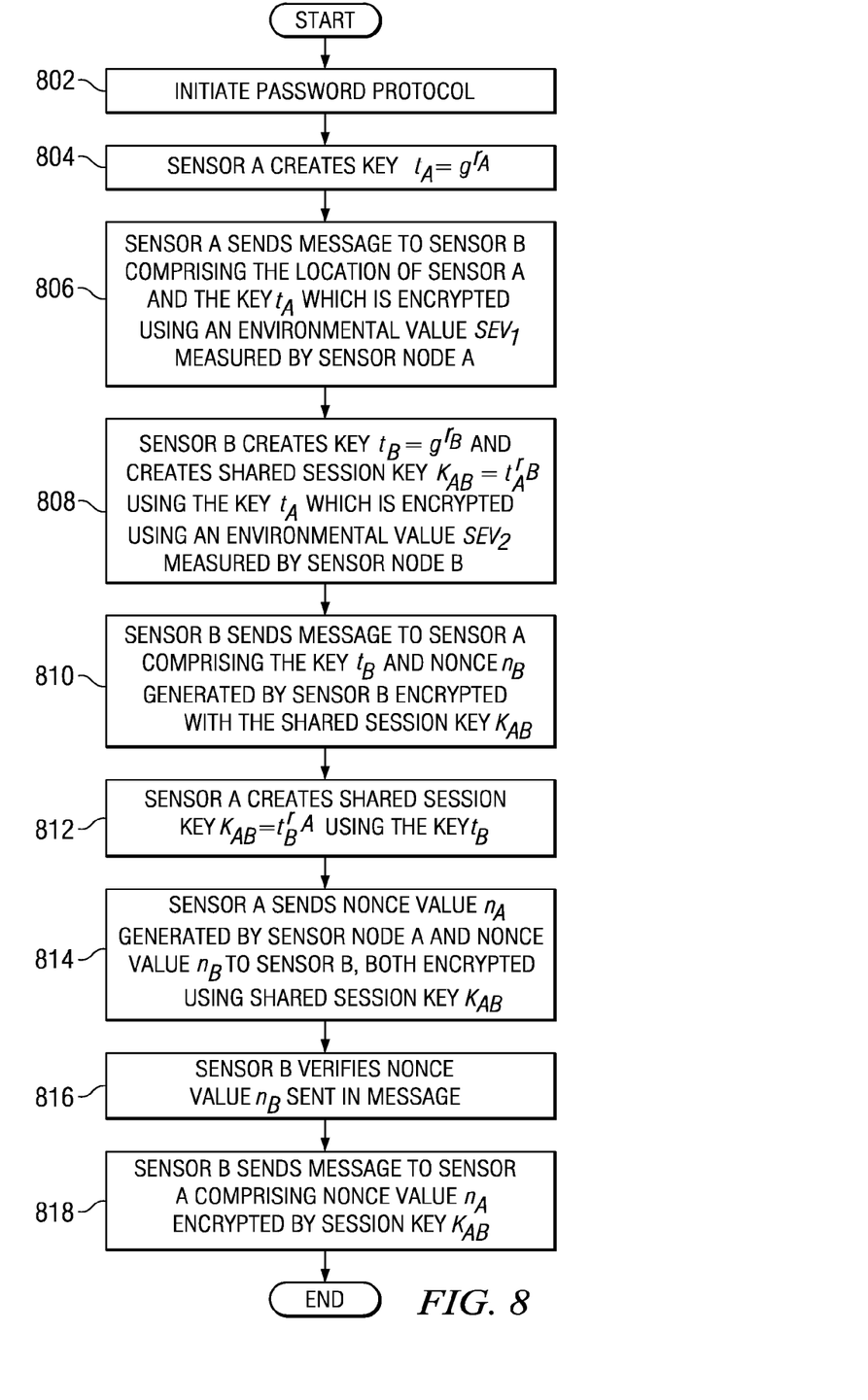
FIG. 8 is a flowchart of a process for using environmental data as passwords to secure communications in a wireless body sensor network in accordance with the illustrative embodiments.

FIG. 8 is a flowchart of a process for using environmental data as passwords to secure communications in a wireless body sensor network in accordance with the illustrative embodiments. The process described in FIG. 8 may be implemented in a sensor network such as wireless body sensor network 100 shown in FIG. 1. The process may be used to establish secure communications between two sensors in a sensor network using physiological data as passwords in a password protocol.

The process begins when two sensor nodes in the body sensor network initiate execution of a protocol to communicate securely with one another (step 802). Sensor nodes A and B each share information comprising generator g of G where $p-1=qr$. Sensor node A creates key $t_A=g^{r_A}$ (step 804). Sensor node A sends a message to sensor node B comprising the location of sensor node A and the key $t_A$ (step 806). Key $t_A$ is encrypted using an environmental value (weak key $SEV_1$) measured by sensor node A.

Upon receiving the message, sensor node B creates key $t_B=g^{r_B}$ and shared session key $K_{AB}=t_A^{r_B}$ using the key $t_A$ (step 808). Sensor node B sends a message to sensor node A comprising the key $t_B$ and nonce $n_B$ generated by sensor node B (step 810). Key $t_B$ is encrypted using an environmental value (weak key $SEV_2$) measured by sensor node B, and nonce $n_B$ is encrypted using shared session key $K_{AB}$.

Sensor node A then creates shared session key $K_{AB}=t_B^{r_A}$ using the key $t_B$ (step 812). Sensor node A sends nonce value ($n_A$) generated by sensor node A and nonce value ($n_B$) to sensor node B, both of which are encrypted using the shared session key $K_{AB}$ (step 814). Sensor node B verifies the nonce value $n_B$ sent in the message (step 816). If the nonce value is valid, sensor node B sends a message to sensor node A comprising nonce value ($n_A$) encrypted by session key $K_{AB}$ (step 818).

Figure 9:
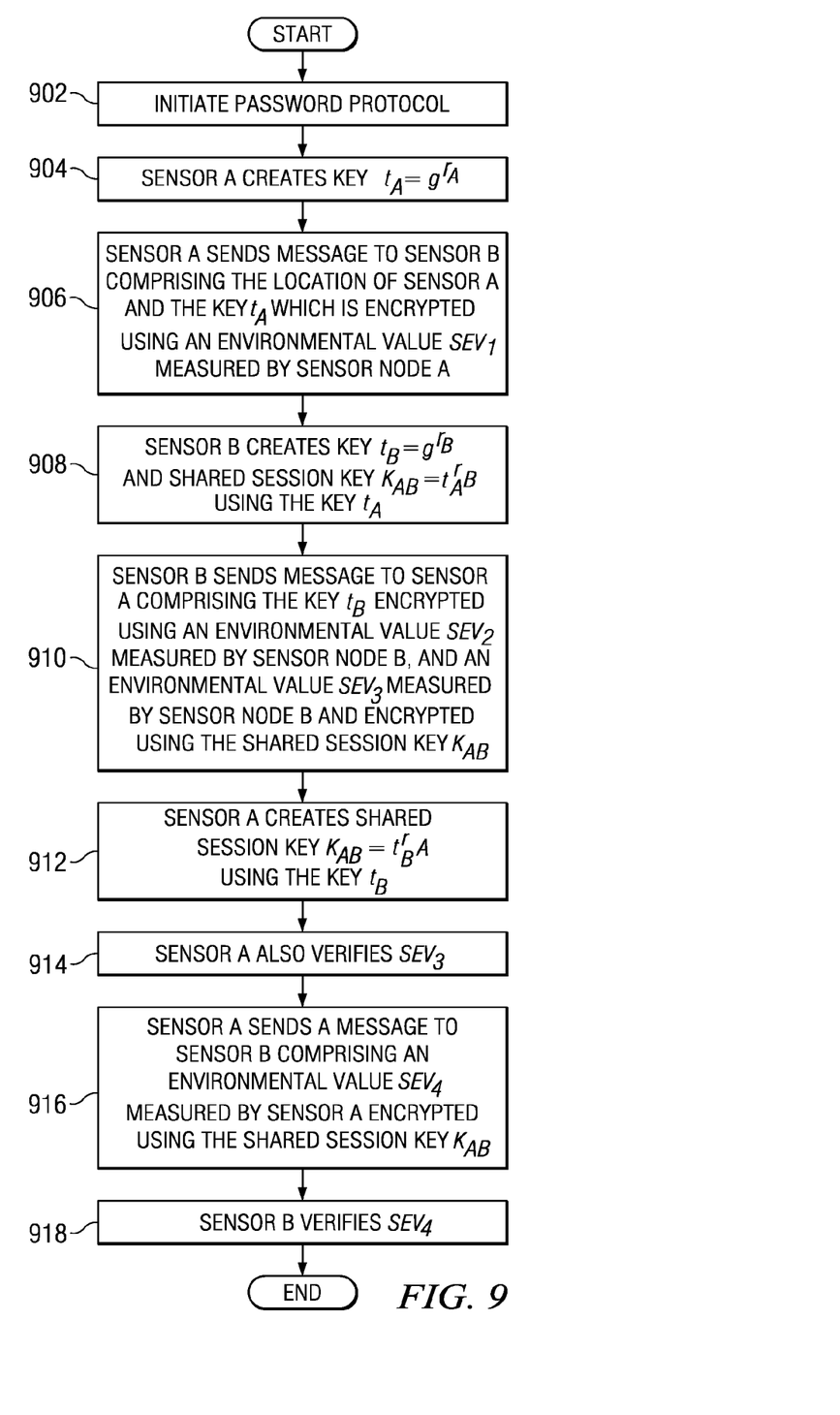
FIG. 9 is a flowchart of a process for using environmental data as nonces to minimize the number of protocol messages in accordance with the illustrative embodiments.

FIG. 9 is a flowchart of a process for using environmental data as nonces to minimize the number of protocol messages in accordance with the illustrative embodiments. The process described in FIG. 9 may be implemented in a sensor network such as wireless body sensor network 100 shown in FIG. 1. The process may be used to reduce communications costs between two sensors in a sensor network and remove a message from the password protocol using physiological data as nonces.

The process begins when two sensor nodes in the body sensor network initiate execution of a protocol to communicate securely with one another (step 902). Sensor nodes A and B each share information comprising generator g of G where $p-1=qr$. Sensor node A creates key $t_A=g^{r_A}$ (step 904). Sensor node A sends a message to sensor node B comprising the location of sensor node A and the key $t_A$ (step 906). Key $t_A$ is encrypted using an environmental value (weak key $SEV_1$) measured by sensor node A.

Upon receiving the message, sensor node B creates key $t_B=g^{r_B}$ and shared session key $K_{AB}=t_A^{r_B}$ using the key $t_A$ (step 908). Sensor node B sends a message to sensor node A comprising the key $t_B$ and an environmental value $SEV_3$ measured by sensor node B (step 910). Key $t_B$ is encrypted using an environmental value (weak key $SEV_2$) measured by sensor node B, and $SEV_3$ is encrypted using shared session key $K_{AB}$.

Sensor node A then creates shared session key $K_{AB}=t_B^{r_A}$ using the key $t_B$ (step 912). Sensor node A also verifies $SEV_3$ (step 914). Sensor node A sends an environmental value $SEV_4$ measured by sensor node A to sensor node B, where $SEV_4$ is encrypted using the shared session key $K_{AB}$ (step 916). Sensor node B may then verify $SEV_4$ (step 918).

Figure 10:
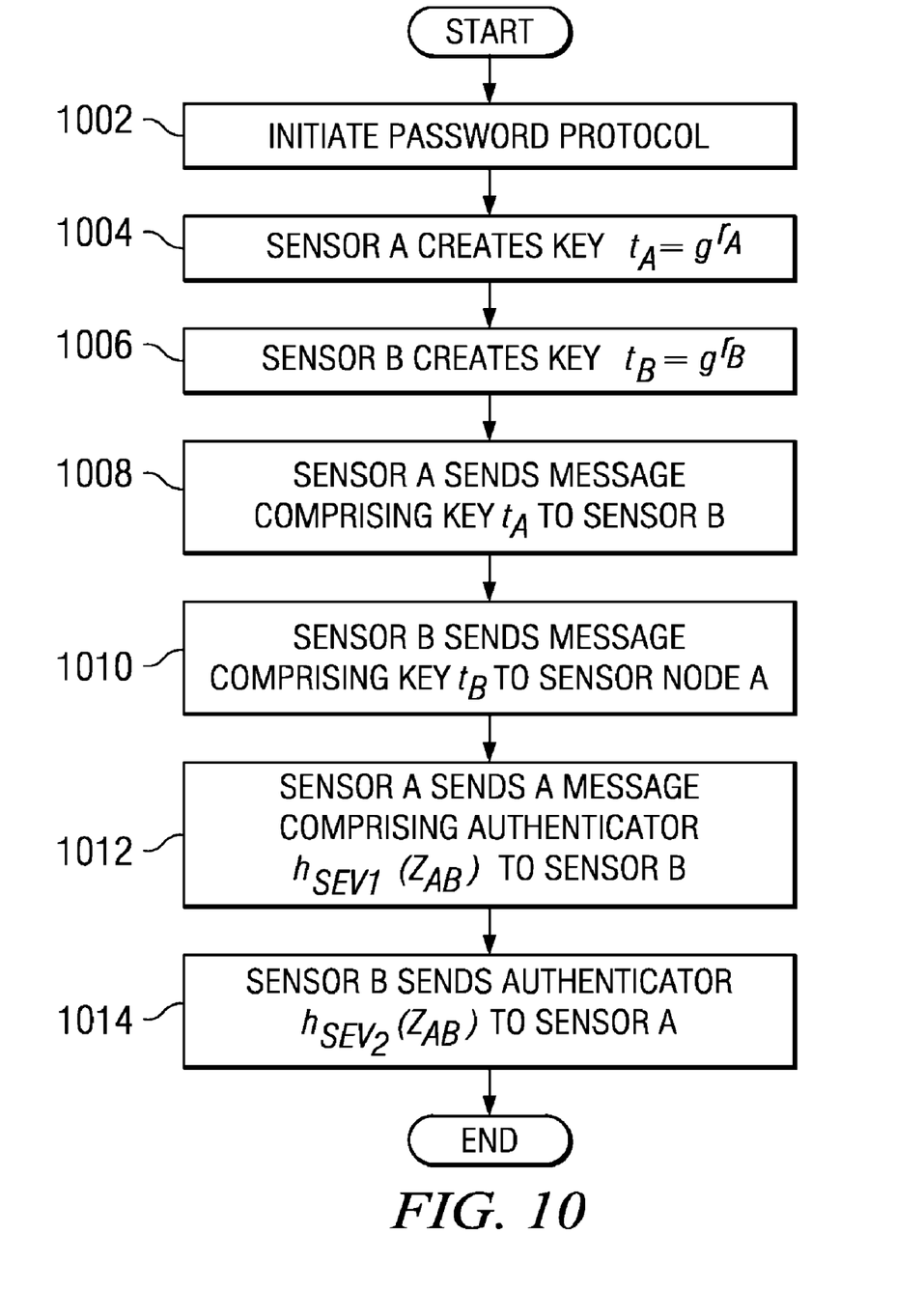
FIG. 10 is a flowchart of a process for securing a wireless body sensor network against an active password attack in accordance with the illustrative embodiments.

FIG. 10 is a flowchart of a process for securing a wireless body sensor network against an active password attack in accordance with the illustrative embodiments. The process described in FIG. 10 may be implemented in a sensor network such as wireless body sensor network 100 shown in FIG. 1. The process uses physiological values and elliptic curves in a password protocol to stop active password attacks in an environment where SEVs are continually changing.

The process begins when two sensor nodes in the body sensor network initiate execution of a protocol to communicate securely with one another (step 1002). Sensor nodes A and B each share environmental values $SEV_1$ and $SEV_2$. Sensor node A creates key $t_A=g^{r_A}$ (step 1004). Sensor node B creates key $t_B=g^{r_B}$ (step 1006).

Sensor node A sends a message comprising key $t_A$ to sensor node B (step 1008). Sensor node B sends message comprising key $t_B$ to sensor node A (step 1010). To authenticate that sensor node B sent $t_B$ to sensor node A, sensor node A sends a message comprising the authenticator $h_{SEV_1}(Z_{AB})$ to sensor node B (step 1012). To authenticate that sensor node A sent $t_A$ to sensor node B, sensor node B sends the authenticator $h_{SEV_2}(Z_{AB})$ to sensor node A (step 1014).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using environmental data as passwords in a password protocol to secure communications in a sensor network, the computer implemented method comprising:
sending, from a first sensor to a second sensor, a first message comprising a location of the first sensor and a first key, wherein the first key is encrypted using a first environmental value measured at the first sensor;
sending, from the second sensor to the first sensor, a second message comprising a second key, wherein the second key is encrypted using a second environmental value measured at the second sensor, and wherein the second message further comprises a first nonce generated by the second sensor, and wherein the first nonce is encrypted using a session key shared between the first sensor and the second sensor;
sending, from the first sensor to the second sensor, a third message comprising the first nonce and a second nonce generated by the first sensor, wherein the first nonce and second nonce are encrypted using the session key;
verifying, at the second sensor, the first nonce;
sending, from the second sensor to the first sensor, a fourth message comprising the second nonce, wherein the second nonce is encrypted using the session key; and
verifying, at the first sensor, the second nonce.

2. The computer implemented method of claim 1, wherein the password protocol is a Diffie-Hellman-based encrypted key exchange (EKE) protocol.

3. The computer implemented method of claim 1, wherein sending the first message further comprises:
creating the first key using an equation $t_A=g^{r_A}$, wherein g is a random number generator and $r_A$ is a random value; and
encrypting the first key with the first environmental value.

4. The computer implemented method of claim 3, wherein sending the second message further comprises:
creating the second key using an equation $t_B=g^{r_B}$, where $r_B$ is a random value;
creating the session key using an equation $K_{AB}=t_A^{r_B}$;
encrypting the second key with the second environmental value; and
encrypting the first nonce with the session key.

5. The computer implemented method of claim 1, wherein the sensor network is a wireless body sensor network.

6. The computer implemented method of claim 1, wherein the first environmental value and the second environmental value comprise physiological data collected from sensors placed in proximity to or within a human body.

7. The computer implemented method of claim 6, wherein the physiological data comprises cryptographically weak values.

8. The computer implemented method of claim 6, wherein the physiological data comprises one of inter-pulse interval or heart rate variance values.

9. The computer implemented method of claim 1, wherein the first environmental value is measured from a same environmental phenomenon as the second environmental value.

10. The computer implemented method of claim 1, wherein the first environmental value is measured from a different environmental phenomenon as the second environmental value.

11. A computer implemented method for using environmental data as passwords in a password protocol to secure communications in a sensor network, the computer implemented method comprising:
sending, from a first sensor to a second sensor, a first message comprising a location of the first sensor and a first key, wherein the first key is encrypted using a first environmental value measured at the first sensor;
sending, from the second sensor to the first sensor, a second message comprising a second key, wherein the second key is encrypted using a second environmental value measured at the second sensor, and wherein the second message further comprises a third environmental value measured at the second sensor, and wherein the third environmental value is encrypted using a session key shared between the first sensor and the second sensor;
verifying, at the first sensor, the third environmental value;
sending, from the first sensor to the second sensor, a third message comprising a fourth environmental value measured at the first sensor, and wherein the fourth environmental value is encrypted using the session key; and
verifying, at the second sensor, the fourth environmental value.

12. A computer implemented method for preventing an active password attack in a sensor network using changing environmental data as passwords in a password protocol, the computer implemented method comprising:
sending, from a first sensor to a second sensor, a first message comprising a location of the first sensor and a first key;
sending, from the second sensor to the first sensor, a second message comprising a second key, and wherein the second message further comprises a collision hash function encrypted using a first environmental value measured at the first sensor, wherein the first environmental value is shared between the first sensor and the second sensor; and
sending, from the first sensor to the second sensor, the collision hash function encrypted using a second environmental value measured at the second sensor, wherein the second environmental value is shared between the first sensor and the second sensor.

13. The computer implemented method of claim 12, wherein the first environmental value and second environmental value change between different instantiations of the password protocol.

14. A non-transitory computer program product for using environmental data as passwords in a password protocol to secure communications in a sensor network, the computer program product comprising:
a computer usable storage device having computer usable program code tangibly embodied thereon, the computer usable program code comprising:
computer usable program code for sending, from a first sensor to a second sensor, a first message comprising a location of the first sensor and a first key, wherein the first key is encrypted using a first environmental value measured at the first sensor;
computer usable program code for sending, from the second sensor to the first sensor, a second message comprising a second key, wherein the second key is encrypted using a second environmental value measured at the second sensor, and wherein the second message further comprises a first nonce generated by the second sensor, and wherein the first nonce is encrypted using a session key shared between the first sensor and the second sensor;
computer usable program code for sending, from the first sensor to the second sensor, a third message comprising the first nonce and a second nonce generated by the first sensor, wherein the first nonce and second nonce are encrypted using the session key;
computer usable program code for verifying, at the second sensor, the first nonce;
computer usable program code for sending, from the second sensor to the first sensor, a fourth message comprising the second nonce, wherein the second nonce is encrypted using the session key; and
computer usable program code for verifying, at the first sensor, the second nonce.

15. The non-transitory computer program product of claim 14, wherein the password protocol is a Diffie-Hellman-based encrypted key exchange (EKE) protocol.

16. The non-transitory computer program product of claim 14, wherein the computer usable program code for sending the first message further comprises:
computer usable program code for creating the first key using an equation $t_A = g^{r_A}$, wherein g is a random number generator and $r_A$ is a random value; and
computer usable program code for encrypting the first key with the first environmental value.

17. The non-transitory computer program product of claim 16, wherein the computer usable program code for sending the second message further comprises:
computer usable program code for creating the second key using an equation $t_B = g^{r_B}$, where $r_B$ is a random value;
computer usable program code for creating the session key using an equation $K_{AB} = t_A^{r_B}$;
computer usable program code for encrypting the second key with the second environmental value; and
computer usable program code for encrypting the first nonce with the session key.

18. The non-transitory computer program product of claim 14, wherein the sensor network is a wireless body sensor network.

19. The non-transitory computer program product of claim 14, wherein the first environmental value and the second environmental value comprise physiological data collected from sensors placed in proximity to or within a human body.

20. The non-transitory computer program product of claim 19, wherein the physiological data comprises cryptographically weak values.

21. The non-transitory computer program product of claim 19, wherein the physiological data comprises one of inter-pulse interval or heart rate variance values.

22. The non-transitory computer program product of claim 14, wherein the first environmental value is measured from a same environmental phenomenon as the second environmental value.

23. The non-transitory computer program product of claim 14, wherein the first environmental value is measured from a different environmental phenomenon as the second environmental value.

24. A non-transitory computer program product for using environmental data as passwords in a password protocol to secure communications in a sensor network, the computer program product comprising:
- a computer usable storage device having computer usable program code tangibly embodied thereon, the computer usable program code comprising:
- computer usable program code for sending, from a first sensor to a second sensor, a first message comprising a location of the first sensor and a first key, wherein the first key is encrypted using a first environmental value measured at the first sensor;
- computer usable program code for sending, from the second sensor to the first sensor, a second message comprising a second key, wherein the second key is encrypted using a second environmental value measured at the second sensor, and wherein the second message further comprises a third environmental value measured at the second sensor, and wherein the third environmental value is encrypted using a session key shared between the first sensor and the second sensor;
- computer usable program code for verifying, at the first sensor, the third environmental value;
- computer usable program code for sending, from the first sensor to the second sensor, a third message comprising a fourth environmental value measured at the first sensor, and wherein the fourth environmental value is encrypted using the session key; and
- computer usable program code for verifying, at the second sensor, the fourth environmental value.

25. The non-transitory computer program product of claim 24, wherein the computer usable program code for sending the first message further comprises:
- computer usable program code for creating the first key using an equation $t_A = g^{r_A}$, wherein g is a random number generator and $r_A$ is a random value; and
- computer usable program code for encrypting the first key with the first environmental value.

26. The computer implemented method of claim 11, wherein sending the first message further comprises:
- creating the first key using an equation $t_A = g^{r_A}$, wherein g is a random number generator and $r_A$ is a random value; and
- encrypting the first key with the first environmental value.

27. The computer implemented method of claim 12, wherein sending the first message further comprises:
- creating the first key using an equation $t_A = g^{r_A}$, wherein g is a random number generator and $r_A$ is a random value.

* * * * *